United States Patent
Parham et al.

(10) Patent No.: US 7,370,195 B2
(45) Date of Patent: May 6, 2008

(54) MOVING PRINCIPALS ACROSS SECURITY BOUNDARIES WITHOUT SERVICE INTERRUPTION

(75) Inventors: Jeffrey B. Parham, Redmond, WA (US); Brendan Dixon, Sammamish, WA (US); Murli Satagopan, Sammamish, WA (US); Richard Bruce Ward, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 725 days.

(21) Appl. No.: 10/667,582

(22) Filed: Sep. 22, 2003

(65) Prior Publication Data

US 2005/0066160 A1    Mar. 24, 2005

(51) Int. Cl.
    *H04L 9/00*    (2006.01)
(52) U.S. Cl. .................. 713/155; 713/154; 713/162; 713/168; 713/182; 713/183; 705/67; 726/2; 726/3; 726/4; 726/5; 726/6; 726/7; 726/30
(58) Field of Classification Search .............. 713/155, 713/154, 162, 168, 182, 183; 726/8, 2, 3, 726/4, 5, 6, 7, 30; 705/67
See application file for complete search history.

(56) References Cited

U.S. PATENT DOCUMENTS

| | | | |
|---|---|---|---|
| 5,908,469 A | 6/1999 | Botz et al. | |
| 6,324,571 B1* | 11/2001 | Hacherl | 709/208 |
| 6,367,009 B1 | 4/2002 | Davis et al. | |
| 6,446,206 B1 | 9/2002 | Feldbaum | |
| 6,510,236 B1* | 1/2003 | Crane et al. | 382/116 |
| 6,912,582 B2* | 6/2005 | Guo et al. | 709/229 |
| 2002/0112155 A1* | 8/2002 | Martherus et al. | 713/155 |
| 2002/0143964 A1* | 10/2002 | Guo et al. | 709/229 |
| 2003/0120948 A1* | 6/2003 | Schmidt et al. | 713/200 |
| 2003/0233328 A1* | 12/2003 | Scott et al. | 705/50 |
| 2004/0177247 A1* | 9/2004 | Peles | 713/155 |
| 2006/0005237 A1* | 1/2006 | Kobata et al. | 726/12 |

* cited by examiner

*Primary Examiner*—Kim Vu
*Assistant Examiner*—April Shan
(74) *Attorney, Agent, or Firm*—Workman Nydegger

(57) ABSTRACT

An improved network architecture employs a super authority having an identity catalog to direct login authentication tasks to appropriate authorities. Authentication tasks may be performed by authorities across namespace boundaries if so directed by the super authority, such that a principal account may be moved without alteration of the account ID. In an embodiment of the invention, the identity catalog comprises a listing associating account IDs with appropriate authenticating authorities.

13 Claims, 6 Drawing Sheets

| IDENTITY CATALOG ||
| --- | --- |
| IDENTITY | AUTHENTICATING AUTHORITY |
| bobsmith@msn.com | Authority A |
| johnjones@microsoft.com | Authority B |
| billwilliams@microsoft.com | Authority A |
| jimjim@microsoft.com | Authority A |
| sallyjones@msn.com | Authority B |

FIGURE 4B

MOVING PRINCIPALS ACROSS SECURITY BOUNDARIES WITHOUT SERVICE INTERRUPTION

FIELD OF THE INVENTION

This invention relates generally to network management and, more particularly, relates to a system and method for authenticating principals in a network environment.

BACKGROUND

As computer networks become more prevalent in all facets of industry and enterprise, users more frequently need to access resources that are located on a computer that is remote from their own machine. However, the possibility of remote users accessing local data raises many security concerns. For example, a remote user may access data that they are not authorized to access, and may even maliciously destroy or alter such data. Accordingly, most network domains require that users login and be authenticated prior to gaining access to resources in that domain. Authentication is intended to ensure that the identity and associated permissions of the user are known prior to granting access. The process of authentication entails checking whether access is appropriate and then either granting or denying access based on the results of that check.

As used herein, a principal is an entity (typically a human, computer, application, or service) that attempts to access a secured resource or facility (e.g. an application). Authentication is the process of proving or verifying identity. An authority is a trusted entity that is used to provide authentication services with respect to some set of principals.

For a given authority, it trusts principals once it has authenticated them, but it may not trust other authorities to have properly authenticated its principals. For this reason, a name space convention has developed whereby particular authorities authenticate only those principals whose account ID resides in a given name space. In particular, the account ID usually comprises at least a user identifier portion and an authenticating authority portion. The authenticating authority portion of the account ID identifies the namespace of the principal ID, and hence the authority that should authenticate the principal. The principal identifier portion usually identifies the particular user as distinct from other users within the same name space. Thus, for example, the account ID bob@dev.microsoft.com should be authenticated by the authority for the domain dev.microsoft.com, whereas the account ID bob@mktg.microsoft.com should be authenticated by the authority for the domain mktg.microsoft.com.

This solution has allowed a certain amount of security with respect to network resources; however the static nature of the name space divisions creates additional problems. For example, when a user moves from one domain to another or is required to have access across domain boundaries the present system is not easily accommodating. In the former case, the user is required to obtain a new account ID that identifies the namespace of the new domain rather than the old domain, while in the latter case the user must either obtain an additional account in the proper namespace or there must exist strong administrative confidence (e.g. trust) between authorities.

BRIEF SUMMARY OF THE INVENTION

Embodiments of the invention provide a new network architecture that allows for alteration of the namespace convention used in principal authentication such that principals may move across security boundaries without changing account IDs, while at the same time substantially maintaining the resource protection provided by prior methods. The architecture according to certain embodiments of the invention comprises a Super Authority having responsibility over a plurality of authenticating authorities. When an authenticating authority receives a login request, it transmits the request to the Super Authority for a decision regarding which authenticating authority should authenticate the associated principal.

In response, the Super Authority evaluates an identity catalog to determine which authority should authenticate the principal. The identity catalog comprises in an embodiment of the invention a mapping of each account ID to an authenticating authority. The mapping is fixed by policy or otherwise rather than being constrained to respect namespace boundaries, so that unlike prior systems, two distinct authenticating authorities may authenticate in the same namespace, and any authenticating authority may authenticate in multiple namespaces. For example, the mapping may be based on the organizational affiliation of principals within an enterprise or the geographical location of principals, etc. Once an authenticating authority has been identified by the Super Authority, the Super Authority either directly sends the login request to the appropriate authority for authentication or otherwise causes the request to be sent to the appropriate authority for authentication.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 4B is a schematic diagram illustrating an identity catalog according to an embodiment of the invention for mapping account identifiers to authenticating authorities;

DETAILED DESCRIPTION

Figure 1:
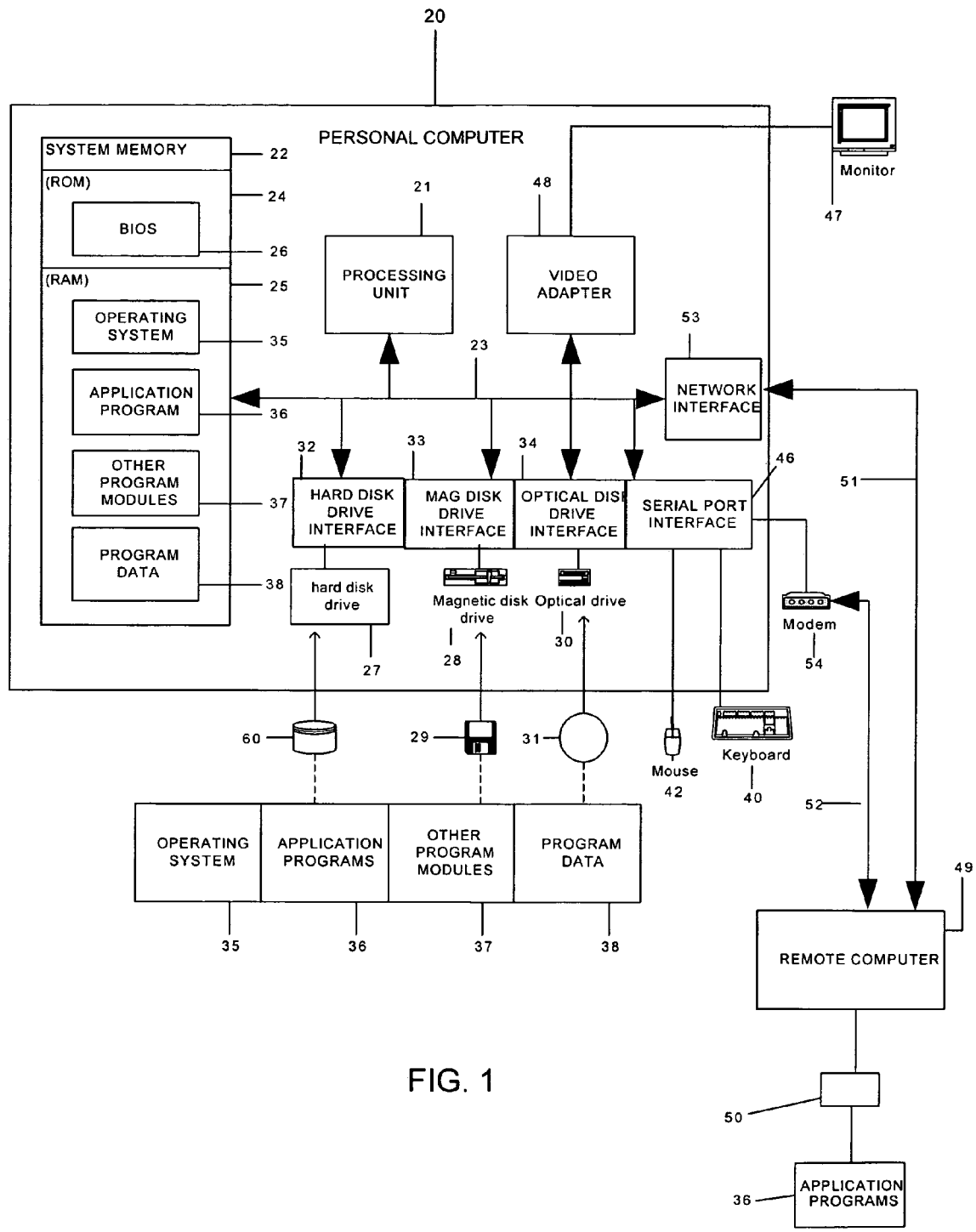
FIG. 1 is a block diagram generally illustrating an exemplary device architecture in which embodiments of the present invention may be implemented.

Turning to the drawings, wherein like reference numerals refer to like elements, the invention is illustrated as being implemented in a suitable computing environment. Although not required, the invention will be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may be practiced in distributed computing environments where tasks are performed by remote processing devices that are linked through a communications network. In a distributed computing environment, program modules may be located in both local and remote memory storage devices.

This description begins with a description of a general-purpose computing device that may be used in an exemplary system for implementing the invention, after which the invention will be described in greater detail with reference to FIGS. 2-5. Turning now to FIG. 1, a general purpose computing device is shown in the form of a conventional computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media. In addition to the aforementioned computer readable media, communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, storage area networks, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB) or a network interface card. A monitor 47 or other type of display device is also connected to the system bus 23 via an interface, such as a video adapter 48. In addition to the monitor, computers may include other peripheral output devices, not shown, such as speakers and printers.

The computer 20 operates in a networked environment using logical connections to one or more remote computers, such as a remote computer 49. The remote computer 49 may be a server, a router, a network PC, a personal computer, a peer device or other common network node, and typically includes many or all of the elements described above relative to the computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the computer 20 is connected to the local network 51 through a network interface or adapter 53. When used in a WAN networking environment, the computer 20 typically includes a modem 54 or other means for establishing communications over the WAN 52. The modem 54, which may be internal or external, is connected to the system bus 23 via the serial port interface 46. Program modules depicted relative to the computer 20, or portions thereof, may be stored in the remote memory storage device if such is present. It will be appreciated that the network connections shown are exemplary and other means of establishing a communications link between the computers may be used.

Herein, the invention will generally be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware. In the following discussion, computing devices such authenticating devices and Super Authority devices may be as described above with respect to FIG. 1 regarding computer 20 and/or remote computer 49, or may alternatively be another type of computing device.

Figure 2A:
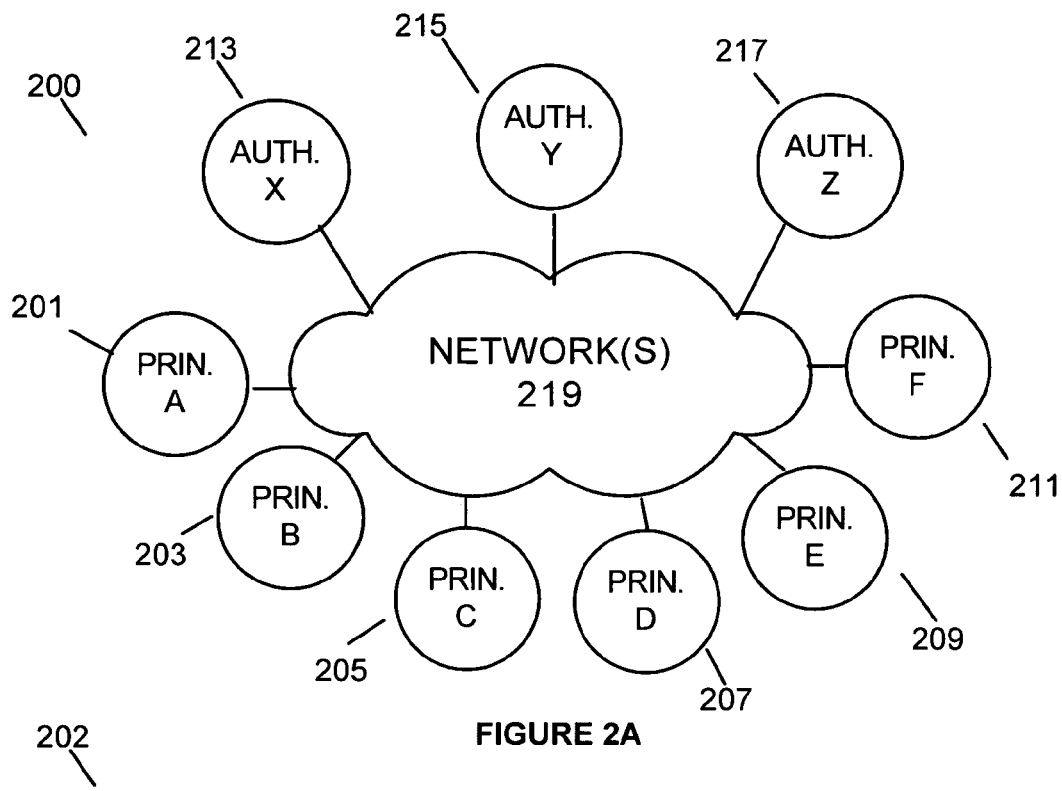
FIG. 2A is a schematic diagram of an example general network architecture within which authenticating authorities associated with principals may be implemented.

FIG. 2A illustrates schematically an exemplary network environment 200 within which prior network resource management techniques have been used. In particular, principal A 201, principal B 203, principal C 205, principal D 207, principal E 209, and principal F 211 are each associated with one of Authority X 213, Authority Y 215, and Authority Z 217. The principals and at least their respective authenticating authorities are communicatively linked via network 219. Each principal may be represented on the network 219 by a computer such as the computer 20 discussed with respect to FIG. 1, a workstation, or any other type of computing device capable of performing the necessary network communication and processing tasks. Network 219 may comprise any number and type of network connections including wired and wireless connections, LAN, WAN, and Internet connections or any combination thereof as well as any other type of network connection.

In existing techniques, each of Authority X 213, Authority Y 215, and Authority Z 217 is responsible for authenticating account IDs within a particular namespace, so that when an account ID is received for authentication, it is immediately clear from the account ID itself which authority is responsible for authentication. Thus, when one of the principals attempts to log in to a particular domain (i.e. the network resources within the namespace associated with a particular authority), the appropriate authority performs authentication by one of a number of known protocols adapted for that purpose and either grants or denies access to the principal. Note that although a principal 201, 203, 205, 207, 209, 211 may be associated with only one of a number of authorities 213, 215, 217, the network connections may exist within environment 200 for the principal to communicate directly or indirectly with authorities and machines on other domains.

Figure 2B:
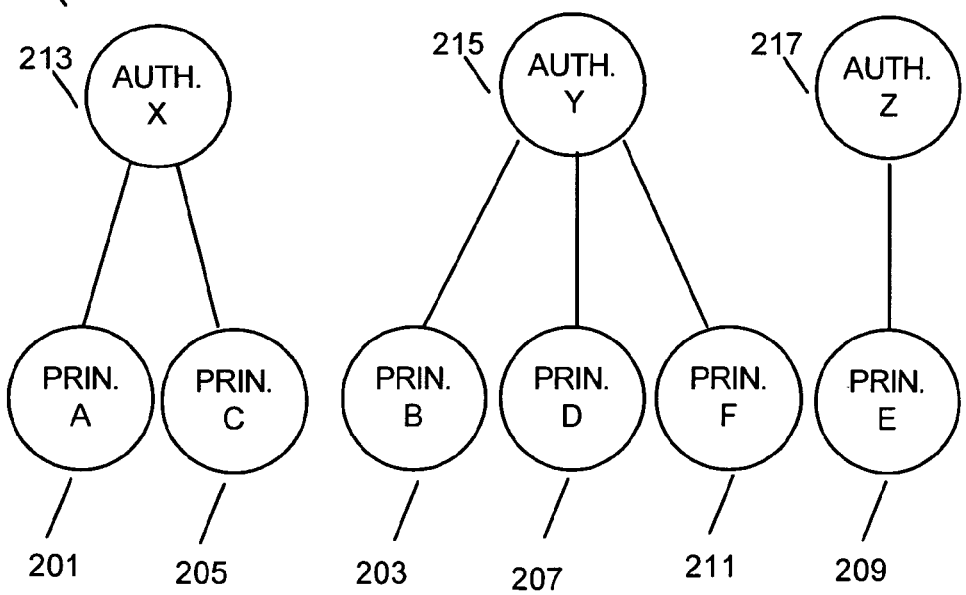
FIG. 2B is an example logical diagram of the associations between principals and authenticating authorities.

Referring to FIG. 2B, the logical domain architecture 202 corresponding to the network diagram of FIG. 2A is shown schematically. In the example shown, principal A 201 and principal C 205 are associated with (e.g. have accounts with) authority X 213, principal B 203, principal D 207, and principal F 211 are associated with authority Y 215, and principal E 209 is associated with authority Z 217. Although each principal may or may not have network connectivity with respect to authorities and machines other than the respective associated authenticating authority, such connections are not depicted in the logical structure 202 of FIG. 2B since the structure 202 of FIG. 2B merely illustrates authentication relationships.

Because of the namespace convention that has been adopted for network resource security reasons as discussed above, it is not possible with the current system to move a principal from one domain to another without changing the principal account ID, resulting in a potential service disruption. That is, since account IDs comprise a namespace identifier to facilitate authentication, and since authenticating authorities authenticate in non-overlapping namespaces, an account ID usable with respect to a particular authority is not usable with respect to another authority, even if permission for access in the second domain would otherwise be grantable.

There are many reasons that a particular enterprise might choose to maintain a network system comprised of multiple domains, or having multiple authorities, and that a particular enterprise may wish to move principals between such multiple domains. For example, in an enterprise merger, a single company or enterprise may be formed from separate pieces that were each previously associated with one or more domains. If the identities of the component enterprises are to be maintained, the resulting enterprise network often comprises as component parts the domains associated with the merged companies. In another example, a multinational or multiregional corporation or interest may be required by law to maintain separate domains of control. For example, a multinational banking company may be required by local law to establish a separate control domain for management personnel within a particular country, so that control of local activities and access to local data is vested only in local personnel.

Other reasons for maintaining multiple authorities include administrative insulation and data isolation. The principal of administrative insulation is useful when decentralized loosely coupled conglomerates wish to share resources to some extent but do not wish to share management of the resources or of the principals associated therewith. The principal of data isolation is useful when the network resources include valuable, confidential or otherwise sensitive data or resources and the creation of multiple authorities minimizes the number of individuals who may access that particular set of resources.

As noted above, it is also often useful or convenient to move a principal across security boundaries. For example, this is often desired when an individual user, associated with a particular user account, changes positions within an enterprise, moving from one division to another. If each division is associated with its own authority, the transferred employee will need their account transferred from one authority to the other. In prior techniques, this required a change of account ID and a concomitant interruption of service or access. Another example situation in which it may be desirable to move a user account occurs after a merger or acquisition when one party to the transaction wishes to migrate its principals to a pre-existing authority associated with another party to the transaction.

The system of the exemplary embodiment described herein maintains administrative insulation and data isolation while enabling principal moves and authority mergers without service interruption. In general, this level of performance is achieved via the use of a Super Authority in conjunction with an identity catalog. As will be described in greater detail hereinafter, the Super Authority is not an authenticating authority, but rather directs an access attempt to an appropriate ordinary authority for authentication. The Super Authority employs an identity catalog to facilitate this task. The identity catalog effectively maps account IDs to authenticating authorities, whereby each account ID is associated with a single authenticating authority.

Figure 3A:
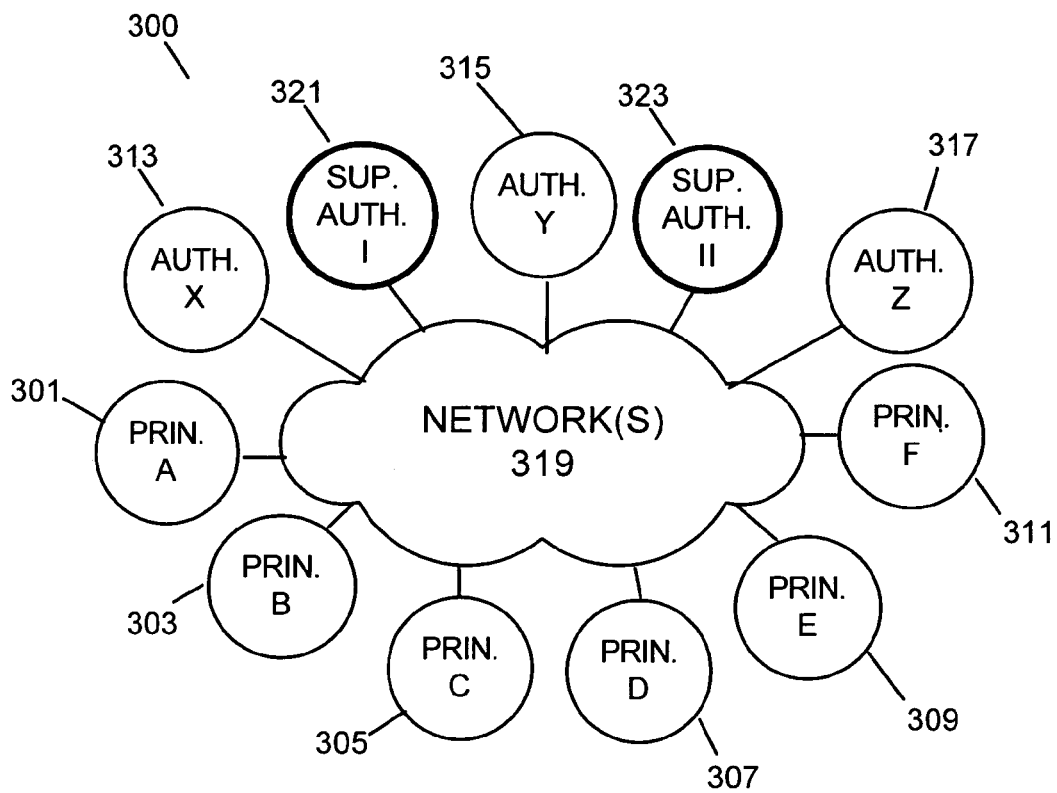
FIG. 3A is a schematic diagram of an example general network architecture within which a Super Authority may be implemented within an embodiment of the invention.

The schematic diagram of FIG. 3A illustrates a network architecture 300 within which a Super Authority according to an embodiment of the invention is implemented. The Super Authority may also be referred to as a controlling authority since it controls authentication of principals but does not actually conduct such authentication with respect to those principals. In addition to principals and authenticating authorities analogous to those shown in FIG. 2A, the architecture 300 further includes one or more Super Authorities illustrated via example Super Authority I (321) and example Super Authority II (323). Each Super Authority 321, 323 may be connected, via the network(s) 319 to some or all of the other network entities shown in the figure. However, the only required connection is between each Super Authority 321, 323 and any authenticating authority or authorities associated with that Super Authority. The interrelationship between authenticating authorities and Super Authorities will be explained in greater detail below.

Figure 3B:
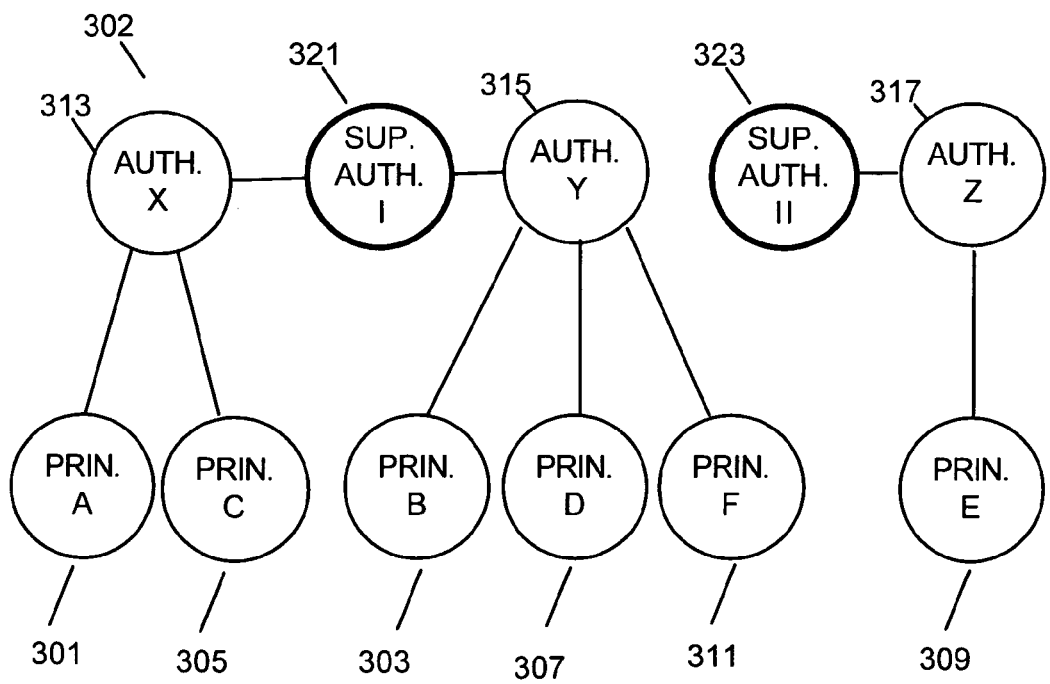
FIG. 3B is an example logical diagram of the associations between Super Authorities, principals, and authenticating authorities according to an embodiment of the invention.

Referring to FIG. 3B, an exemplary logical relationship between authenticating authorities and Super Authorities is illustrated schematically via logic structure 302. As shown, each Super Authority 321, 323 is associated with one or more authenticating authorities, while each authenticating authority is associated with at most one Super Authority. Note that although an authority may be associated with a single principal and/or a Super Authority may be associated with a single authority, such situations are typically, although not necessarily, transient.

While the invention does not require that each authenticating authority be associated with only one Super Authority, such is preferable in that it tends to simplify administration and authentication tasks. In the illustrated example, Super Authority I (321) is associated with Authority X (313) and Authority Y (315), while Super Authority II (323) is associated with Authority Z (317).

In turn, each of Authority X (313), Authority Y (315), and Authority Z (317) is associated with particular users or principals, e.g. particular accounts. However, unlike other authentication techniques, the linking between authenticating authorities and principals is based not on non-overlapping name spaces, but is instead based upon policy choices embodied in an identity catalog maintained by the relevant Super Authority. The identity catalog, which will be discussed in greater detail hereinafter, essentially maps each principal's account identifier to an authenticating authority, and the mapping of the catalog may be changed without changing account identifiers.

Since the mapping is fixed by policy or otherwise rather than being constrained to respect namespace boundaries, two distinct authenticating authorities may authenticate in the same namespace, and any authenticating authority may authenticate in multiple namespaces. The mapping may be based on the organizational affiliation of principals within an enterprise, the geographical location of principals, seniority, position, etc.

Figure 4A:
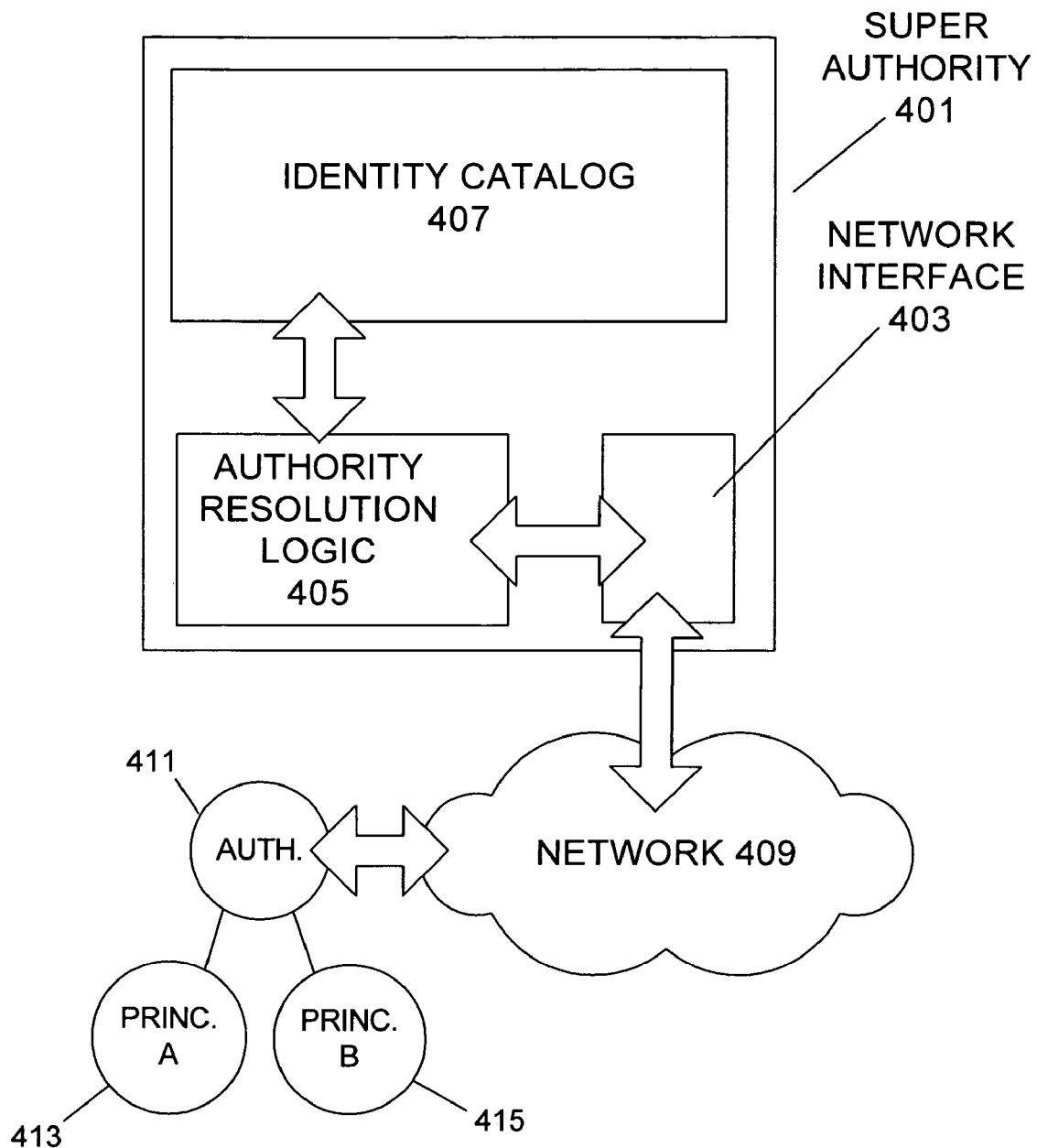
FIG. 4A is a schematic diagram illustrating a Super Authority within an environment usable to implement an embodiment of the invention.

FIG. 4A shows a schematic representation of a Super Authority such as Super Authority I (321) and Super Authority II (323). The diagram of FIG. 4A is given for illustration and simplification purposes, and represents one possible implementation of the Super Authority 401. The invention includes other implementations as will be appreciated by those of skill in the art given the teachings herein. The exemplary Super Authority 401 is comprised of a network interface 403, authority resolution logic 405, and an identity catalog 407. The components are communicably interrelated such that the network interface 403 and the identity catalog 407 are available to the authority resolution logic 405.

The Super Authority 401 may be implemented on any of a number of types of computing devices. In an embodiment of the invention, the Super Authority 401 is implemented on a server, and the components of the Super Authority 401 are software modules and elements as described generally above with respect to FIG. 1. In an embodiment of the invention, the communications paths between the components comprise the bus or internal communications paths of the server computer.

Details of the identity catalog 407 according to an embodiment of the invention are shown schematically in FIG. 4B. In particular, the identity catalog 407 provides a mapping of principal account IDs (e.g. bobsmith@msn.com) to authenticating authorities. The mapping is illustrated in FIG. 4B as a one-to-one mapping in a tabular format, wherein each entry 453 in an identity column 455 is mapped via the table to a corresponding entry 457 in an authenticating authority column 459.

As illustrated by the example shown, the mapping of principal account IDs to authenticating authorities does not need to respect namespace boundaries. For example, clients in the "msn.com" domain are authenticated by both authenticating authority A and authenticating authority B. The same is true of clients in the "microsoft.com" domain. Simply changing a mapping in the identity catalog results in a remapping of the relevant principal to a different authenticating authority under the same Super Authority. As discussed above, this is beneficial in that the authenticating responsibility can be altered without requiring alteration of the account ID itself.

In overview, the operation of the Super Authority 401 is as follows according to an embodiment of the invention. A machine belonging to a user or principal such as machine labeled Principal A (413) contacts an authority such as residing at the machine labeled Authority 411 requesting access to resources. This request may be in the form of a log in request or attempt. The contacted Authority 411 then sends the request to the Super Authority 401 via the network 409 and the network interface 403 for identification by the authority resolution logic 405 of an appropriate authority, using the identity catalog 407, to authenticate the principal identified in the request. The Super Authority 401 then either directly transmits an authentication request to the selected authenticating authority or causes such to be transmitted, such as by the initially receiving authority. The selected authenticating authority may be but need not be the authenticating authority that initially received the login attempt from the principal.

Note that the process of changing the contents of the identity catalog 407, for example to remap a given account ID to another authenticating authority, is also preferably carried out when needed by the authority resolution logic 405 according to an embodiment of the invention. Typically an administrator issues commands that cause the authority resolution logic 405 to make appropriate alterations to the identity catalog 407. Such commands may be received via the user interface of the computer hosting the super authority 401, or may arrive via the network interface 403 or other network connection, from a remote location.

Figure 5:
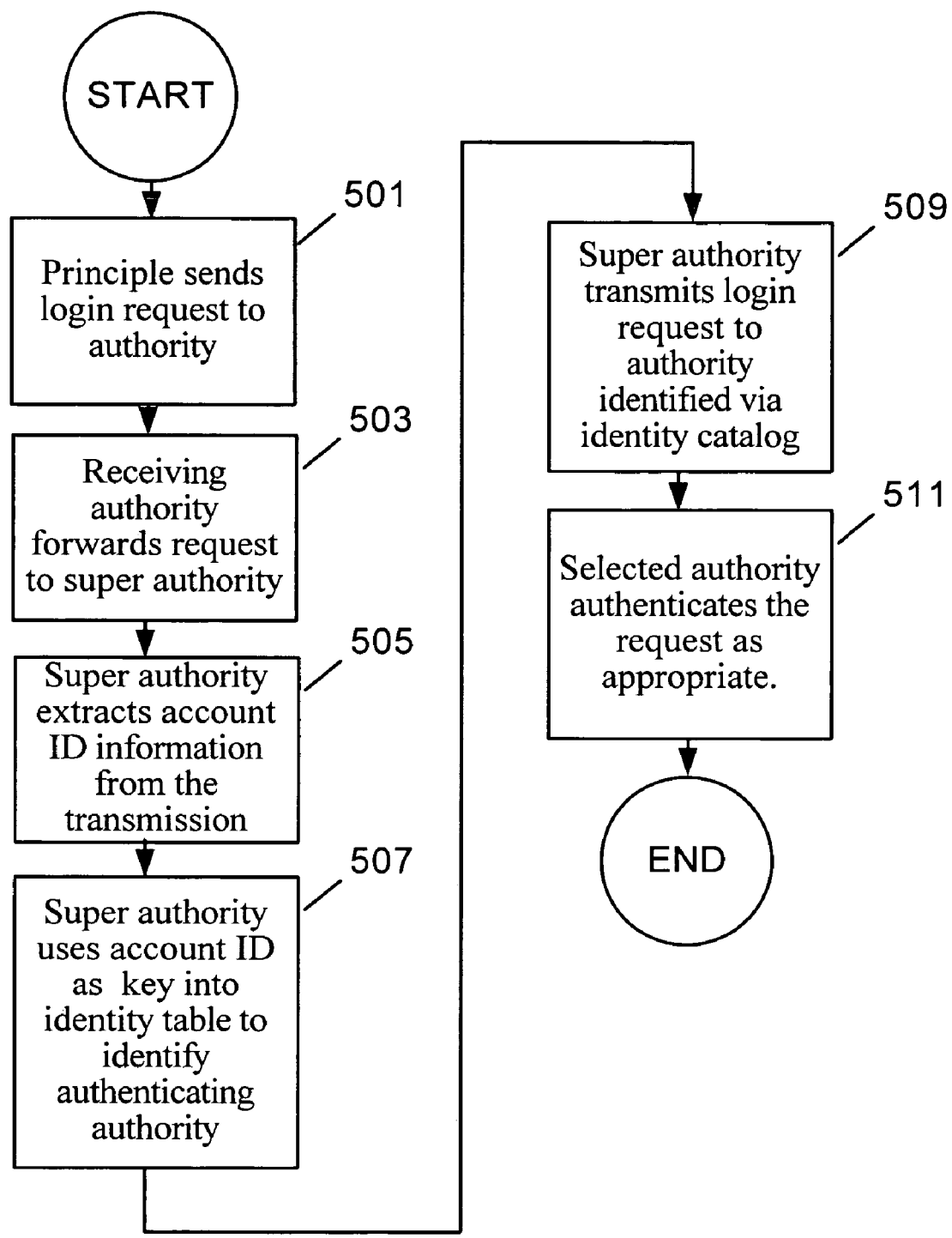
FIG. 5 is a flow chart showing steps usable during login to authenticate a principal account ID according to an embodiment of the invention.

The flow chart 500 of FIG. 5 conveys in more detail the operation of the novel architecture described herein while processing a request for access to network resources. In particular, at step 501, a principal attempts to log in to access particular network resources by sending a login request to an authority. The request includes the principal account ID, which is typically comprised of an individual identifier and a domain identifier as shown in FIG. 4B. At step 503, the authority receiving the request does not immediately decide whether or not to authenticate the requesting principal, but instead forwards the request to the Super Authority responsible for the particular receiving authority.

Subsequently at step 505, the Super Authority extracts the account ID information from the transmission and uses the account ID information, in step 507, as a key into the identity table to identify an authenticating authority associated with the particular principal. Note that the Super Authority may first check to determine whether the particular sending authority is one for which the Super Authority is responsible. An authority identifier may be used for this purpose. Note also that the authenticating authority associated with the particular principal identity may or may not be the same as the authority that received and passed on the login request depending upon the contents of the identity catalog. At step 509, the Super Authority causes the login request to be transmitted to the appropriate authority identified via the identity catalog.

At this step, the super authority may either directly send the request or cause a third party to send the request. The process of forwarding the request directly can be referred to as "chaining." However, chaining is not required and the request may be fulfilled via any of a number of other mechanisms as well. For example, the Super Authority, having resolved the appropriate authenticating authority in step 507, may "refer" the request instead of chaining it. Referral entails the Super Authority responding to the authority that forwarded the request and conveying to that authority the identity of the appropriate authenticating authority. The request is then passed to the appropriate authenticating authority from the authority that initially forwarded the request to the Super Authority. While either chaining or referral, or indeed other methods, may be used, the use of referrals is preferred if the relevant authorities are communicably linked. This is due to the fact that referral generally allows for greater system scaling since a single Super Authority may be a party in a greater number of authentication requests during a particular period of time.

Finally, in step 511, the selected authority authenticates the request as appropriate. As a result of the authentication, if successful, the authenticating authority may transmit a permission notification to the principal.

It will be appreciated that the novel architecture and system of the exemplary embodiment described herein allows increased flexibility of authentication without a concomitant increase in vulnerability of the system to masquerading and other malfeasance. For example, in a traditional system where two distinct authorities A and B are trusted to authenticate "@msn.com" and "@microsoft.com" principals, the authorities A and B must have high administrative confidence in each other, since it would be possible for an administrator for authority A to authenticate a principal that should only be authenticated by authority B, and vice versa. In other words, authority A would need trust authority B's administrators as much as it trusts its own administrators, and in some cases this is simply not possible. However the exemplary system described herein allows authorities to share namespaces without necessarily having mutual administrative confidence. Each authority need only have administrative confidence in the Super Authority administrator, which may be much more palatable since the number, location, and affiliation of Super Authority administrators will typically be more constrained than those of standard authorities. A further beneficial result attainable in many embodiments of the invention is that principals can be moved across namespace boundaries without changing their identity; a simple change in the Super Authority identity catalog is all that is required to record a new mapping of a principal identity to an authenticating authority.

It will be appreciated that an improved system and method for principal account authentication have been described. In view of the many possible embodiments to which the principals of this invention may be applied, it should be recognized that the embodiments described herein with respect to the drawing figures are meant to be illustrative only and should not be taken as limiting the scope of invention. For example, those of skill in the art will recognize that some elements of the illustrated embodiments shown in software may be implemented in hardware and vice versa or that the illustrated embodiments can be modified in arrangement and detail without departing from the spirit of the invention. Moreover, it will be appreciated that the invention can implemented in any suitable network environment of any size and type. Moreover, although illustrations herein show a small number of principals, authorities, and Super Authorities, the invention implies to systems with a greater or lesser number of any of these entities. Therefore, the invention as described herein contemplates all such embodiments as may come within the scope of the following claims and equivalents thereof.

We claim:

1. At a super authority connected to a network environment, an assigned authenticating authority and one or more other authenticating authorities also being connected to the network environment, each authenticating authority configured to authenticate of subset of principals that access the network environment through different domains, a method of controlling authentication of a principal for access to network resources in the network environment, wherein the principal's account identifier is configured for authentication at an authenticating authority from among the assigned authenticating authority and the one or more other authenticating authorities, the method comprising:

receiving at the super authority a request for an authenticating authority resolution from an authenticating authority that is not authorized to authenticate the principal, wherein the request comprises an account ID of the principal to be authenticated, the account ID including an individual identifier and a domain identifier;

accessing an assignment mapping that maps each account ID in a plurality of account IDs to a corresponding plurality of authenticating authorities that are authorized to authenticate the account ID, the account ID including an individual identifier and a domain identifier, the account ID being used to identify comprising the identity of the principal;

locating within the mapping an identity of an assigned authenticating authority from among the one or more authenticating authorities that corresponds to the individual identifier and domain identifier in the account ID of the principal to be authenticated;

causing an authentication request to be transmitted to the assigned authenticating authority located from among the one or more other authenticating authorities, the assigned authenticating authority having been located using the principal's individual identifier and domain identifiers in the principal's account ID, wherein the request asks the assigned authenticating authority to authenticate the principal;

altering the assignment mapping whereby an account ID previously mapped to a first authenticating authority is remapped to a second authenticating authority.

2. The method according to claim 1, wherein each account ID comprises a namespace identifier, and wherein the plurality of account IDs comprises at least two account IDs having a common namespace identifier, wherein the at least two account IDs are mapped to at least two different respective ones of the plurality of authenticating authorities via the assignment mapping.

3. The method according to claim 1, wherein each account ID comprises a namespace identifier, and wherein the plurality of account IDs comprises at least two account IDs having different namespace identifiers, wherein the at least two account IDs are mapped to the same one of the plurality of authenticating authorities via the assignment mapping.

4. The method according to claim 1, wherein the assignment mapping is based at least in part on the organizational affiliation of principals within an entity.

5. The method according to claim 1, wherein the assignment mapping is based at least in part on the geographical location of principals.

6. At a super authority connected to a network environment, an assigned authenticating authority and one or more other authenticating authorities also being connected to the network environment, each authenticating authority configured to authenticate of subset of principals that access the network environment through different domains, an apparatus for controlling authentication of a principal for access to network resources in the network environment, wherein the principal's account identifier is configured for authentication at an authenticating authority from among the assigned authenticating authority and the one or more other authenticating authorities, the apparatus comprising:

means for receiving at the super authority a request for an authenticating authority resolution from an authenticating authority that is not authorized to authenticate the principal, wherein the request comprises an account ID of the principal to be authenticated, the account ID including an individual identifier and a domain identifier;

means for accessing an assignment mapping that maps each account ID in a plurality of account IDs to a corresponding plurality of authenticating authorities that are authorized to authenticate the account ID, the account ID including an individual identifier and a domain identifier, the account ID being used to identify comprising the identity of the principal;

means for locating within the mapping an identity of an assigned authenticating authority from among the one or more authenticating authorities that corresponds to the individual identifier and domain identifier in the account ID of the principal to be authenticated;

means for causing an authentication request to be transmitted to the assigned authenticating authority located from among the one or more other authenticating authorities, the assigned authenticating authority having been located using the principal's individual identifier and domain identifiers in the principal's account ID, wherein the request asks the assigned authenticating authority to authenticate the principal;

means for altering the assignment mapping whereby an account ID previously mapped to a first authenticating authority is remapped to a second authenticating authority.

7. The apparatus according to claim 6, wherein each account ID comprises a namespace identifier, and wherein the plurality of account IDs comprises at least two account IDs having a common namespace identifier, wherein the at least two account IDs are mapped to at least two different respective ones of the plurality of authenticating authorities via the assignment mapping.

8. The apparatus according to claim 6, wherein each account ID comprises a namespace identifier, and wherein the plurality of account IDs comprises at least two account IDs having different namespace identifiers, wherein the at least two account IDs are mapped to the same one of the plurality of authenticating authorities via the assignment mapping.

9. At a super authority connected to a network environment, an assigned authenticating authority and one or more other authenticating authorities also being connected to the network environment, each authenticating authority configured to authenticate of subset of principals that access the network environment through different domains, computer executable instructions stored in a volatile or non-volatile computer readable medium to execute a method of controlling authentication of a principal for access to network resources in the network environment, wherein the principal's account identifier is configured for authentication at an authenticating authority from among the assigned authenticating authority and the one or more other authenticating authorities, the method comprising the steps of:

receiving at the super authority a request for an authenticating authority resolution from an authenticating authority that is not authorized to authenticate the principal, wherein the request comprises an account ID of the principal to be authenticated, the account ID including an individual identifier and a domain identifier;

accessing an assignment mapping that maps each account ID in a plurality of account IDs to a corresponding plurality of authenticating authorities that are authorized to authenticate the account ID, the account ID including an individual identifier and a domain identifier, the account ID being used to identify comprising the identity of the principal;

locating within the mapping an identity of an assigned authenticating authority from among the one or more authenticating authorities that corresponds to the individual identifier and domain identifier in the account ID of the principal to be authenticated;

causing an authentication request to be transmitted to the assigned authenticating authority located from among the one or more other authenticating authorities, the assigned authenticating authority having been located using the principal's individual identifier and domain identifiers in the principal's account ID, wherein the request asks the assigned authenticating authority to authenticate the principal;

altering the assignment mapping whereby an account ID previously mapped to a first authenticating authority is remapped to a second authenticating authority.

10. The computer executable instructions according to claim 9, wherein each account ID comprises a namespace identifier, and wherein the plurality of account IDs comprises at least two account IDs having a common namespace identifier, wherein the at least two account IDs are mapped to at least two different respective ones of the plurality of authenticating authorities via the assignment mapping.

11. The computer executable instructions according to claim 9, wherein each account ID comprises a namespace identifier, and wherein the plurality of account IDs comprises at least two account IDs having different namespace identifiers, wherein the at least two account IDs are mapped to the same one of the plurality of authenticating authorities via the assignment mapping.

12. The computer executable instructions according to claim 9, wherein the assignment mapping is based at least in part on the organizational affiliation of principals within an entity.

13. The computer executable instructions according to claim 9, wherein the assignment mapping is based at least in part on the geographical location of principals.

* * * * *